July 24, 1956  J. L. PATTERSON ET AL  2,756,124
URANIUM CHLORINATION PROCESS
Filed March 25, 1947  2 Sheets-Sheet 1

INVENTORS.
John L. Patterson
Alan Bell
BY
Robert A. Lomander

INVENTORS.
John L. Patterson
Alan Bell

2,756,124

URANIUM CHLORINATION PROCESS

John L. Patterson, Oak Ridge, and Alan Bell, Kingsport, Tenn., assignors, by mesne assignments, to the United States of America as represented by the United States Atomic Energy Commission Application March 25, 1947, Serial No. 737,156

14 Claims. (Cl. 23—14.5)

This invention relates to the manufacture of chlorides of uranium by the reaction of a source of uranium with a chlorination medium at elevated temperatures. More particularly, this invention concerns a chlorination process and apparatus adaptable to large scale industrial operation for the treatment of oxides of uranium.

The chlorination of uranium compounds to obtain various uranium chlorides, such as the tetrachloride ($UCl_4$) and the pentachloride ($UCl_5$), has been carried out prior to the present invention, and processes and apparatus are described in various publications and patent applications. For example, copending companion application Serial No. 557,544, filed October 6, 1944, now Patent No. 2,734,795, issued February 14, 1956, in the name of Evers and Carignan, describes a method wherein the oxide materials treated, the chlorinating agents employed, and certain other features, are analogous or identical with corresponding features of the present invention. The present inventors have developed certain improvements in said Evers' and Carignan's prior work, which improvements are disclosed herein.

By the method and apparatus to the present invention chlorides of uranium may be produced in large quantities quickly and efficiently and in a substantially continuous manner which lends itself to utilization in large scale industrial operations.

This invention has for one object to provide a process and apparatus for the production of chlorides of uranium.

Another object is to provide a liquid phase method of chlorinating uranium compounds wherein certain unconsumed or excess components from the reaction may not only be reutilized, but are reutilized in a manner whereby the subsequent chlorination reaction may be expedited.

A further object is to provide a method of handling reaction mixtures containing chlorides of uranium whereby certain chlorides are separated as the desired end product of the process and other chlorides are separated for return and reuse in the process of production.

Still another object is to provide a substantially continuous chlorination method particularly adapted to the production of uranium tetrachloride.

Still another object is to provide an apparatus arrangement for chlorination, as above indicated, and for the separation and processing of the chlorination product.

Other objects will appear hereinafter.

It has been found that sources of uranium such as a uranium oxide, either new oxide derived from the ore or recovered uranium material which has been converted to the oxide, may be reacted with a chlorinating agent in the liquid phase, under superatmospheric pressure and under certain temperature conditions, to produce a reaction mixture comprising the uranium tetrachloride together with either small or large amounts of uranium pentachloride. The foregoing operations in general may be the same as have been described in the aforementioned companion Patent No. 2,734,795. We have found that the reaction mixture, containing the tetrachloride and pentachloride together with unconsumed chlorinating reagent, may be controlled as respects viscosity and solubilities so that it is adapted on an industrial scale to standard operations, such as transmission by gravity flow or simple pumping, separation by filtering, decantation, or centrifugation, or a combination of such operations, and that by means of such operations the excess chlorinating medium may be readily separated and returned to the process. Not only does this permit the reuse of unconsumed chlorinating medium, but by virtue of the presence of certain components therein having a catalytic effect, the subsequent chlorination reaction can be caused to start more quickly as contrasted, for example, with instances where new chlorinating medium is utilized. We have further found that although new chlorinating agent may be and is added, the sources of new chlorinating reagent may have a considerable bearing on the operation of the process as will be described in detail hereinafter.

For a more complete understanding of our invention, reference will be made to the attached drawings forming a part of the present application.

Figure 1:
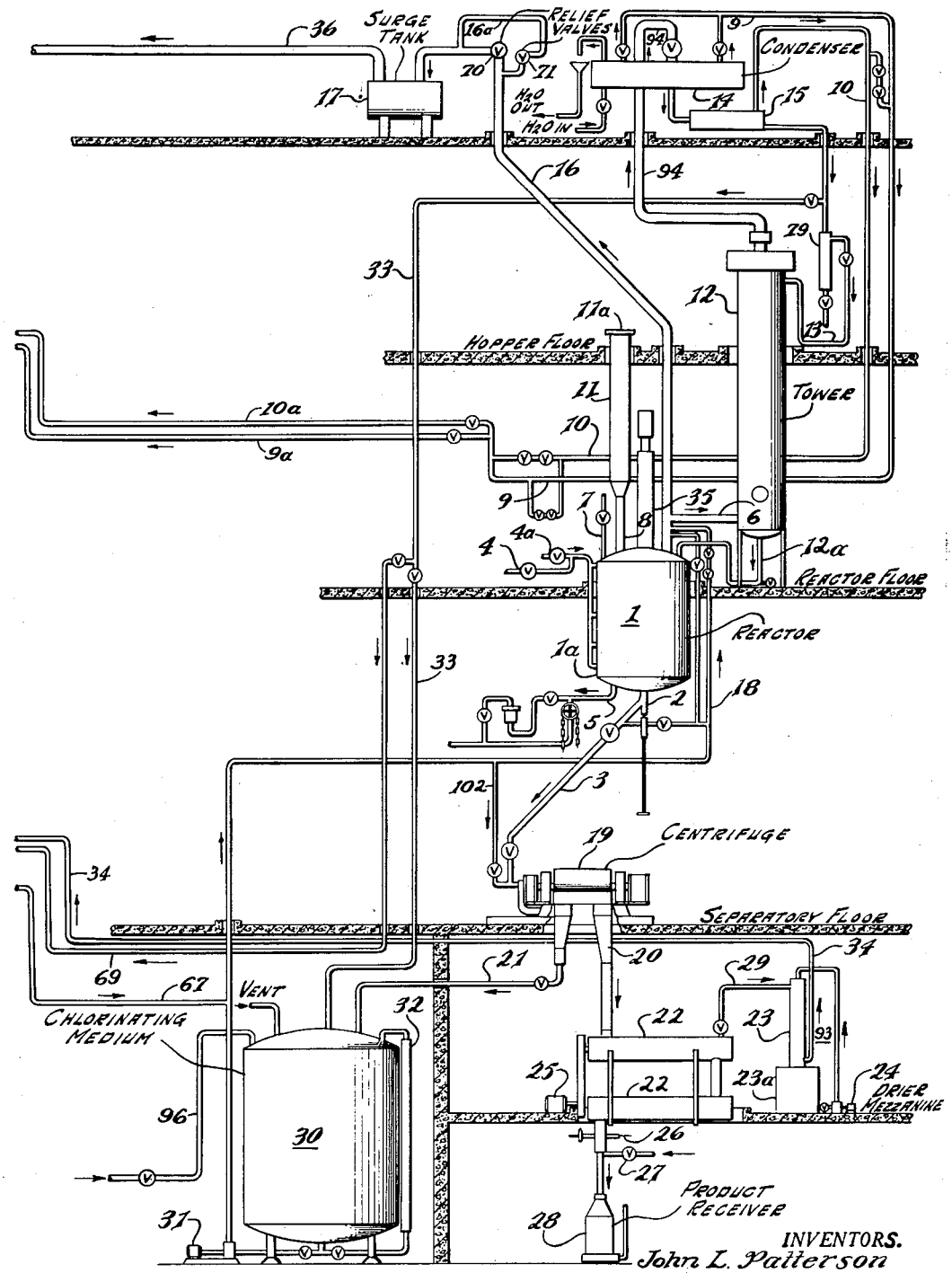
Fig. 1 is a semi-diagrammatic side elevation, somewhat in the nature of a flow sheet, showing in particular the reaction and production recovery system of the present invention.

Referring now to the drawings, reference numeral 1 designates the main reactor which will be understood to be supplied with a cooling and heating jacket 1a. The reactor 1 may be a commercially obtainable autoclave preferably lined with a corrosion resistant material and constructed to withstand several hundred pounds of pressure. While only a single main reactor has been indicated in the drawing, several such reactors may be connected in parallel in keeping with usual industrial practice so that while one reactor is being discharged, cleaned, or otherwise being used, a chlorination reaction may be proceeding simultaneously in another parallel reactor.

Conduits 4 and 4a may be provided for supplying a cooling medium or a heating medium, such as water or steam, respectively, to the reactor jacket 1a. The heating medium or the coolant may be withdrawn by means of drain tap outlet 5 at the bottom of jacket 1a. Likewise, there are provided various valves, instruments, and mechanism of a standard nature, including an agitator 35. However, since any conventional control equipment may be employed for facilitating operation, detailed reference is not made to such items, and it will be understood that appropriate valves and control instruments, such as rotameters, pumps, and the like, will be incorporated in the apparatus at suitable points in accordance with accepted engineering practice.

The reactor 1 is provided with an inlet conduit 8 connected with a feed hopper 11 to which may be fed the uranium values to be chlorinated. A gasketed flange cap 11a is securely bolted on the top of hopper 11 after the insertion of the feed materials, thus forming a pressure-tight seal for the hopper during the reaction.

The reactor 1 is also provided with a number of other conduits, such as conduit 18 which constitutes a supply line to reactor 1 for the chlorinating medium from a storage tank 30. Although only one storage tank 30 is shown in Fig. 1, several such tanks may be utilized interchangeably so as to enable one or several reactors to be continuously supplied with chlorinating medium from one storage tank while another storage tank is being charged with fresh chlorinating medium. Each of the storage tanks, such as 30, may be cross-connected with any or all of the reactors, such as 1, by means of supply conduits, such as 18, and by the proper positioning of valves on such conduits. The level of chlorinating medium is indicated by a sight glass 32. New chlorinating medium may be added as necessary by means of line 96, the open end of which may be connected to the carbon tetrachloride supply source (not shown).

Conduit 6 connects reactor 1, via a portion of line 16, to fractionating column 12 which in turn is connected, by way of line 94, to the top of a condenser 14, one purpose of this arrangement being to permit gases, such as phosgene, which are evolved in the reaction, to escape via vent lines 9 and 10. Vent lines 9 and 10 make a valve controlled connection to vent lines 9a or 10a which then connect, by way of lines 62 and 47, to a scrubbing system which will presently be described in detail. Vent lines 9a and 10a also connect, by way of lines 42 and 43, to explosion tank 61. Valves 77 and 78 at the start of lines 42 and 43 are pressure release safety valves.

At the same time chlorinating medium and other reaction components are fractionated in column 12, condensed out in condenser 14, and flow back to reactor 1 through surge tank 15, drip leg 79, wherein broken bits of packing material from column 12 are trapped out, conduit 13, column 12, and conduit 12a. Or, as may be desirable at various stages of the chlorinating reaction, the condensed chlorinating medium from condenser 14 may be returned to storage tank 30 through line 33 by appropriate valve manipulation.

In connection with this alternative return of chlorinating medium, it is to be noted that while the reactors are primarily utilized for the production of uranium tetrachloride and the like, as herein described, said reactors may be conveniently utilized as a type of distillation apparatus in conjunction with other parts of the disclosed system, for the purification of recycled chlorinating medium which has attained an undesirable state of contamination due to excessive recycling through the reaction stage. While other reactors 1 and other tanks 30 may be in use for reaction purposes, one or more sets of the above may be in use as distillation equipment. For example, a charge of excessively contaminated chlorinating medium may be pumped to reactor 1 from tank 30 through conduit 18. The material is then distilled from reactor 1 through fractionating tower 12. The first fraction returning through line 33 may contain undesirable quantities of water and may be bypassed from line 33 to chlorinating medium settling tank 57 by way of line 69. Settling tank 57 or multiples thereof have been found useful for the collection and separation of said water containing fractions of chlorinating medium. When a sufficient quantity of the impure chlorinating medium has been collected and allowed to settle in tank 57, the chlorinating medium layer at the bottom of the tank may be pumped by way of lines 67 and 18 to reactor 1 for redistillation, a substantial portion of which may be returned in the dry, purified form by means of line 33 to storage tank 30. The remaining water layer in tank 57 may be drained to a sewer through conduit 56.

An emergency pressure relase system is provided for reactor 1 by connecting reactor 1 by way of conduit 16 to a surge tank or equivalent device 17. Interposed between the reactor 1 and the surge tank 17 are two pressure release safety valves 70 and 71 parallel to each other in line 16 and by-pass line 16a. Both of these valves are spring adjusted so as to automatically open should unsafe operating pressures accidentally occur in reactor 1, thereby releasing the unsafe pressure from reactor 1 to surge tank 17. Two valves are used in the event of the possible failure of one. Line 36 connects surge tank 17 to explosion tank 61 where the main force of the excess pressure is absorbed.

Figure 2:
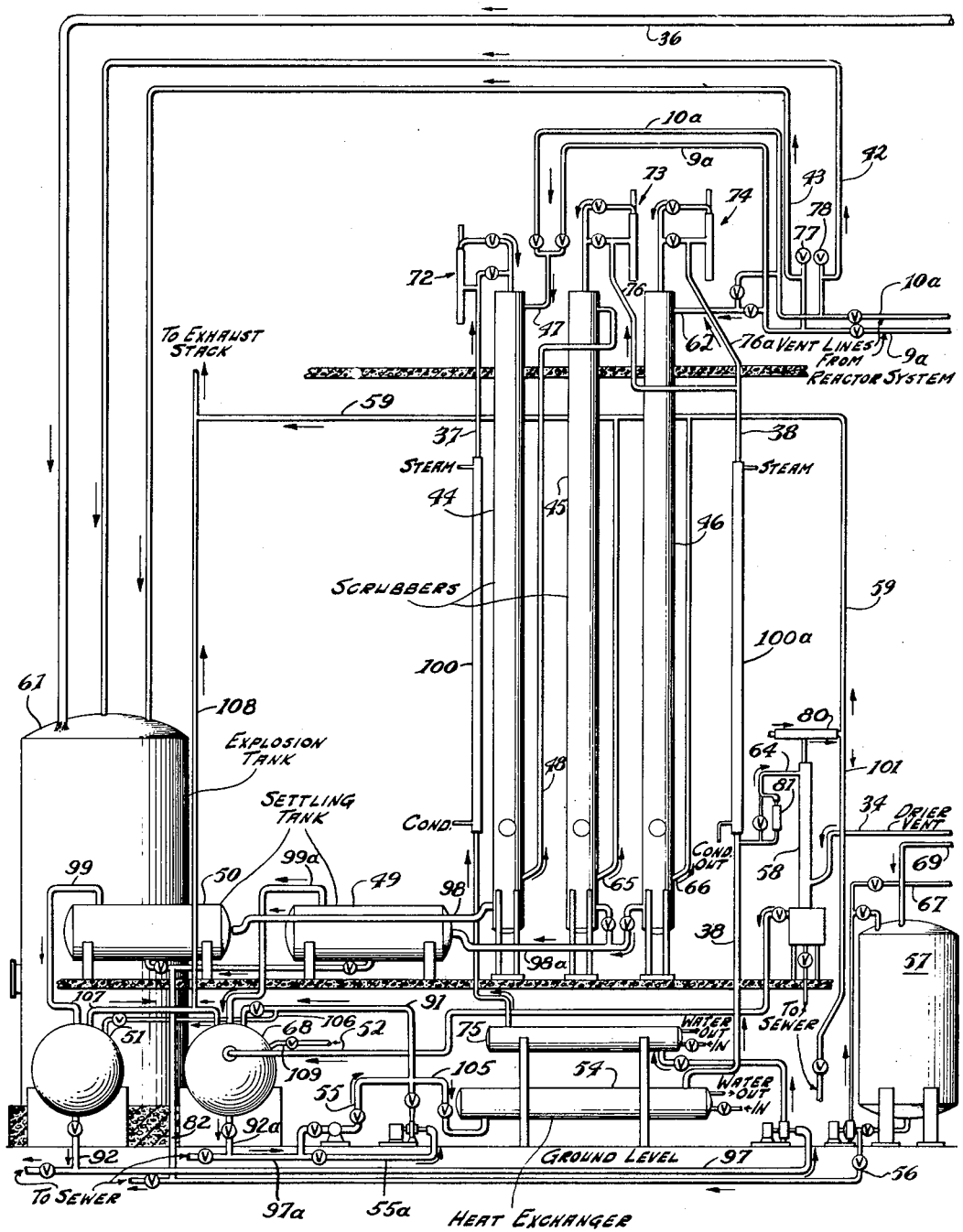
Fig. 2 is a semi-diagrammatic side elevation view, also in the nature of a flow sheet, showing in particular the apparatus setup utilized for the disposal of noxious gases which may be produced in the reaction.

The scrubbing system, which is shown in Fig. 2, is essentially a disposal system for the noxious gases, particularly phosgene, evolved in reactor 1 during the reaction. Neutralization of the phosgene with an alkali of sodium may be accomplished in a preliminary scrubbing column 44 and a final scrubbing column 45 when the toxic content of the evolved gases is high, and in a final scrubbing column 46 alone when the toxic content is low. Scrubbing column 44 is provided with dilute caustic so as to effect a preliminary neutralization of the toxic gases, whereas scrubbing columns 45 and 46 are provided with a concentrated caustic so as to reduce the toxic content of gases passing therethrough to substantially zero.

Whenever the volume of gases being evolved in the reactor 1 is high, or whenever these gases have a high toxic content, they are forced, by suitable valve manipulation, to enter the scrubbing system by way of line 47 which connects lines 9a and 10a to preliminary scrubbing column 44. The gases leave scrubbing column 44 by way of exit line 48 which line connects to a final scrubbing column 45. The now completely neutralized gases leave column 45 by way of exit line 65, which connects to exhaust line 59, which line in turn, is connected to an exhaust stack, not shown.

Whenever the volume of gases being evolved in reactor 1 is low, or whenever these gases have a low toxic content, lines 9a and 10a are directly connected, by way of line 62, to a final scrubbing column 46, wherein the gases are completely neutralized in one scrubbing operation. The neutralized gases leave column 46, by way of exit line 66 which also connects to exhaust line 59.

Dilute caustic is pumped to the preliminary scrubbing column 44 from recirculation tank 51 by way of lines 92 and 97, heat exchanger 75, and line 37, whereas concentrated caustic is pumped to the final scrubbing columns 45 and 46 from recirculation tank 68 by way of lines 92a, 97a, 55 or 55a, and 105, heat exchanger 54, line 38, and lines 76 and 76a. Rotameters 72, 73, and 74 may be utilized for gauging the caustic supply rate to columns 44, 45, and 46, respectively. Heat exchangers 54 and 75 are supplied with a suitable coolant such as water. Caustic supply lines 37 and 38 may be provided with steam jackets, as indicated at 100 and 100a, respectively, for the purpose of preventing a possible freeze-up when the equipment is not in use in cold weather.

The non-gaseous products of the scrubbing process continuously flow from the bottom of scrubbing column 44 to the dilute caustic settling tank 50 by way of line 98, and from the bottom of scrubbing columns 45 and 46 to the concentrated caustic settling tank 49 by way of line 98a. After settling out in tanks 50 and 49, the top layer of caustic is returned to recirculation tanks 51 and 68, respectively, by way of lines 99 and 99a, respectively, and the lower layer of undesired products of the scrubbing process is drained by way of line 82 to a sewage system. A controllable interconnection is provided between the dilute and the concentrated caustic circulatory system whereby caustic may be transferred from the concentrated to the dilute system after it has become weakened by repeated recycling through final scrubbing columns 45 and 46. In order to accomplish this, the valves in lines 105 and 91 are closed and that in line 106 is opened. As a further convenience, if with the valve in line 105 still closed, the valve in line 106 is closed and that in line 91 opened, then a simple recirculation of the caustic in tank 68 is obtained. Any vapors present in settling tanks 49 and 50 and in recirculation tanks 51 and 68 may be discharged to the exhaust stack by means of lines 107 and 108. Makeup concentrated caustic may be pumped into recirculation tank 68 by way of inlet line 109, it being understood that line 109 may be connected to a suitable supply source of concentrated caustic. Caustic which has become too weakened to be useful even in the preliminary scrubbing column 44 may be released from recirculation tank 51 to sewer by way of lines 92 and 97, and from recirculation tank 68 by way of lines 92a and 97a.

Returning now to a consideration of the non-gaseous products of the main reaction taking place in reactor 1, this reactor is provided with a drain outlet at 2 which constitutes a type of valve known industrially as a rising-stem flush bottom tank valve. Although other type valves may be satisfactorily utilized at 2, this type valve has proved most useful in providing smooth draining of the heavy slurries which may result at frequent intervals from the herein-described reactions and which might otherwise cause serious clogging at the exit point. To further obviate plugging difficulties, a dry air inlet 7 is provided to the reactor 1, it being understood that inlet 7 is connected at its open end to a suitable source of dry air, not shown. When plugging occurs at the bottom of the reactor, all exits except the plugged one may be closed and air pressure may be exerted through line 7 to break the plug. This dry air may also be transmitted to any other parts of the apparatus that may be reached from the reactor by proper positioning of valves, if dry air is needed for purging or other purposes. Dry air rather than wet air must be used for this purpose since some of the reaction products readily hydrolize to form extremely corrosive compounds.

Valve 2 connects reactor 1 to conduit 3 from which the reaction products, in the form of a slurry, may be tapped off by gravity flow, when valve 2 is open, to separator system 19. This separator system may comprise a decanter, filter, centrifuge, or combination of such devices, for obtaining general separation of the liquid from the solid reaction products. It has been found that under the correct operating conditions hereinafter specified, the uranium pentachloride is partially soluble in the excess carbon tetrachloride, whereas the uranium tetrachloride may be regarded as substantially insoluble therein. Hence, the liquid product, which is separated in separator 19 and then diverted through conduit 21 to chlorinating storage tank 30, constitutes a solution containing a small amount of uranium pentachloride dissolved in carbon tetrachloride. Since the uranium pentachloride has a catalytic effect on the main reaction, the reuse of this solution is even more effective than would be the use of new carbon tetrachloride.

On the other hand, the solid component, which is led off through conduit 20, comprises the desired end product, uranium tetrachloride, and it may be conducted to driers 22, or similar devices, from which it may be collected in receiver 28 by opening slide valve 26. Inlet 27 is provided for blowing nitrogen, carbon dioxide, or other inert gas countercurrent to the product in drier 22. The uranium tetrachloride may be screw-fed through the driers, the screws being activated by a drive unit 25. The by-products evolved from the drying treatment in driers 22 are carried off through conduit 29 to the product de-entraining scrubber, indicated generally at 93.

The de-entraining scrubber 93 comprises a tower 23 having a reservoir 23a at its base. It utilizes water, for example, as a scrubbing medium, which water is circulated by means of a pump 24. Solid particles which are entrained in the off gases from driers 22 are substantially completely removed by scrubber 93. The slurry of scrubbed solid particles may be periodically discharged from reservoir 23a, and sent to a uranium recovery cycle (not shown) for further treatment. The off gases may be discharged through line 34 to scrubbing tower 58, which utilizes concentrated caustic obtained from line 38, by way of line 64, as the scrubbing medium. Gases and other materials resulting from the decomposition treatment may be discharged through exhaust conduit 59, the discharge being aided by the action of steam ejector 80, while the caustic scrubbing medium may be returned to recirculating tank 68 through conduit 52. Rotameter 81 is useful in gauging the rate of flow of caustic through scrubber 58. Condensed steam from ejector 80 may flow to waste by way of line 101.

It may be desirable under certain conditions to subject the carbon tetrachloride in storage tank 30 to a liquid-solid separation process for purification purposes. In such case, the carbon tetrachloride may be circulated from the storage tank 30 to the separator 19 by way of lines 18 and 102, the purified carbon tetrachloride returning to the storage tank 30, by way of line 21.

The operation of the apparatus is apparent to a substantial extent from the legends appearing on the drawing and the preceding description. However, the operation will be further apparent from the following general description as well as the description contained in the specific example. In general, the reactor 1 is filled with suitable sources of chlorinating medium and the oxide of uranium to be chlorinated. Preferably the chlorinating medium is carbon tetrachloride derived from hydrocarbons. The reaction may be started by heating for a period, this initial heating period being shorter if a catalyst, such as uranium pentachloride, is present. In general, the process of chlorination under super-atmospheric pressure may be in accordance with details set forth in the previously mentioned Evers and Carignan copending application 557,544. After the reaction has been accomplished, the reactor 1 may be cut out and other reactors cut in, if several in parallel are being utilized.

In the present process, sufficient chlorinating medium is preferably employed so that the slurry of reaction products present in the reactor after completion of the reaction is sufficiently fluid for it to be conducted by gravity through conduit 3 to separator 19, in which separator a simple solid-liquid separation is accomplished. The solid component comprises the desired chlorination end product, uranium tetrachloride, whereas the liquid component, collected in tank 30, is repumped by means of supply pump 31 back to reactor 1 through conduit 18, whereby providing a source of chlorinating medium which will react much faster and better than new chlorinating medium by reason of its uranium pentachloride content.

The solid component comprising the wet uranium tetrachloride, plus some small amount of uranium pentachloride, is passed through driers 22, which may be of any conventional construction, and from which the treated product is discharged into product receiver 28. The driers are operated at a sufficiently high temperature to decompose any pentachloride to tetrachloride, as well as to dry the solids.

As already indicated, the vapors from this drying operation are conducted through conduit 29, scrubber system 93, and line 34 to decomposer 58 from which they are discharged through a stack to the atmosphere. Scrubber 93 is not operated with a caustic solution (which would thus eliminate decomposer 58) because caustic would precipitate the uranium as uranium diuranate which would then plug the scrubber.

Still further details concerning our process will be apparent from the following example: A suitable reactor comprising a glass-lined autoclave, as already described, was filled with a certain quality $CCl_4$. It has been found that the $CCl_4$ should be free of acetone, water, and sulfur compounds. That is, $CCl_4$ prepared from $CS_2$ is not as satisfactory as $CCl_4$ obtained from hydrocarbons. Uranium trioxide was added to the reactor so that the ratio of oxide to $CCl_4$ was about 1,500 lbs. to 10,000 lbs.

If the oxide of uranium is finely divided, the reaction starts more rapidly. The reaction is promoted by recirculation of certain materials, as will be described below. In this particular example, the reaction was started by circulating a heating medium in the reactor jacket. The reaction soon became exothermic at which time a cooling medium replaced the heating medium in the jacket to hold the temperature within the limits specified. The temperature of the reaction was maintained between approximately 110° C. and 190° C., about 160° C. being preferred. The reaction was conducted under pressure and when a pressure of approximately 95 pounds per square inch was indicated, the $CCl_2$ formed in the reaction was vented through the scrubbing columns already described. Sufficient venting was carried out to control the pressure within the range of approximately 95 to about 120 pounds per square inch. The amount of venting, and thus the reaction pressure, was regulated by proper manipulation of the various valves controlling the discharge of reaction gases into lines 9 and 10 from condenser 14, and surge tank 15. The reaction mixture was mechanically agitated during the reaction sufficiently to prevent caking.

After the reaction ceased to give off $CCl_2$, the reaction mixture was let down to atmospheric pressure and was held at the boiling point for an extended period, namely, at about 70° C. to 80° C. for between 1 to 3 hours in order to permit most of the noxious gases to pass off into the scrubbing system. The reaction mixture in the reactor, due to the above-indicated choice of ratio of $CCl_4$ to oxide, is such that it will flow readily. After cooling in the reactor, the reaction mixture was permitted to flow through a centrifuge which separated out the desired $UCl_4$ product.

The separated $CCl_4$ contained the $UCl_5$ formed in the reaction, $UCl_5$ being soluble in $CCl_4$, whereas the $UCl_4$ may be regarded as insoluble. This recovered $CCl_4$, with its dissolved component, was then recirculated back to the reactor for the next production, thereby acting as a particularly advantageous source of $CCl_4$ since it already contains the catalytic $UCl_5$. The solid $UCl_4$ from the centrifuge was heated in driers to temperatures of the order of 250° to 300° C. in order to drive off any residual $CCl_4$, and the like. The dried $UCl_4$ product was then cooled and treated with inert type gas by blowing carbon dioxide, nitrogen, or the like, counter current to the product.

In the above reaction, substantially quantitative yields, based on the oxide conversion to the chloride, were obtained. That is, by the use of the excess chlorinating reagent not only was a flowable reaction product slurry obtained, but practically all of the oxide charge was consumed in the reaction. The uranium tetrachloride collected in container 28 was of high quality and suitable for use in processes for the separation of isotopes.

While in the operation of the process, the specified oxides, and the specified chlorinating medium, such as chlorinating medium obtained from hydrocarbons, which medium is free of acetone, water, and sulfur compounds, are preferred, other sources of materials may be used, but with less desirable results. Finely divided oxide of uranium (preferably $UO_3$) prepared from uranium compounds recovered from isotope separation processes, as by methods of the type described in copending applications Ser. Nos. 532,159, 532,160 and 617,126, now Patent No. 2,733,128, issued January 31, 1956, are preferred rather than an oxide of uranium prepared from other sources inasmuch as it has been discovered that such recovered type oxide, when reacted with the recirculated chlorinating medium of the present invention, reacts faster and more completely than certain other sources of charge materials. While a ratio of chlorinating reagent to oxide of greater than six to one by weight has been described, still larger excesses of chlorinating reagent or somewhat smaller excesses may be used. In any case, sufficient excess chlorinating reagent is preferably used to obtain a flowable slurry of reaction products. As already indicated, a plurality of reactors may be utilized in parallel operation, as well as a larger number of condensers, scrubbers, and other items indicated on the drawing.

Although the above description has been particularly directed to the application of the invention to the production of uranium tetrachloride, the invention is also applicable to the production of uranium pentachloride with an appropriate change in the reaction pressure according to the teachings of the aforesaid copending Patent No. 2,734,795 of Evers and Carignan. Thus, if uranium pentachloride is the desired end product, it is only necessary to permit the reaction pressure to rise to a somewhat higher value than previously indicated, to say 180 pounds per square inch. This can be accomplished either by not purging the reaction gases at all or by delaying the purging thereof until after the desired pressure is reached. In such a case, the principal chloride of uranium which is formed will be the pentachloride. A small portion of the uranium pentachloride formed is sufficient to saturate the remaining carbon tetrachloride, the remaining large portion condensing out of the solution in solid form. Thus, it will be apparent that the above-described liquid-solid separation may be applied to the resulting reaction mixture with equally advantageous results, the solid component being the desired end product, uranium pentachloride, and the liquid component being a solution of uranium pentachloride in carbon tetrachloride, which solution is ideally suited for return to the reactor as the chlorinating agent for a subsequent reaction.

It is to be understood, of course, that the term "uranium pentachloride" or the empirical formula "$UCl_5$" as used herein and in the appended claims is not intended to signify a particular molecular structure, but rather to specify the uranium compound to which these designations have been applied in the prior art. It is not necessary, for carrying out the present invention, that this compound have the molecular structure representable as $UCl_5$, and it is recognized that the true molecular structure of this compound may be $UCl_6 \cdot UCl_4$ or some other structure corresponding to the empirical formula $UCl_5$.

It is to be understood that all matters contained in the above description and examples are illustrative only and do not limit the scope of this invention as it is intended to claim the invention as broadly as possible in view of the prior art.

What is claimed is:

1. In a process for the preparation of chloride of uranium of the class consisting of uranium tetrachloride and uranium pentachloride, comprising reacting oxide of uranium with stoichiometric excess of liquid carbon tetrachloride as a chlorinating agent, to convert a portion of the oxide of uranium to uranium tetrachloride and a portion thereof to uranium pentachloride, the improved procedure for effecting successive preparations of said chloride of uranium, each by said process, which comprises, after so reacting, mechanically separating the liquid component of the resulting reaction mixture from the solid component thereof, which solid component comprises the desired end product chloride of uranium, and applying said liquid component, which resultingly comprises unreacted carbon tetrachloride having uranium pentachloride dissolved therein, to comprise said chlorinating agent, resultingly enhanced by the presence of uranium pentachloride as a catalyst for the reaction, in subsequent said preparation.

2. In a process for the preparation of chloride of uranium of the class consisting of uranium tetrachloride and uranium pentachloride, comprising reacting oxide of uranium with a stoichiometric excess of liquid carbon tetrachloride as a chlorinating agent in the presence of uranium pentachloride as a catalyst, to convert a portion of the oxide of uranium to uranium tetrachloride and a portion thereof to uranium pentachloride, the improved procedure for effecting successive preparations of said chloride of uranium, each by said process, which comprises, after so reacting, mechanically separating the liquid component of the resulting reaction mixture from the solid component thereof, which solid component comprises the desired end product chloride of uranium, and applying said liquid component, which resultingly comprises unreacted carbon tetrachloride having uranium pentachloride dissolved therein, to comprise said chlorinating agent and said catalyst, in subsequent said preparation.

3. The process of claim 1 wherein said step of mechanically separating liquid component from solid component is effected specifically by centrifugation.

4. In a process for the preparation of chloride of uranium of the class consisting of uranium tetrachloride and uranium pentachloride, comprising reacting an oxide of uranium with a stoichiometric excess of liquid carbon tetrachloride as a chlorinating agent, to convert a portion of the oxide of uranium to uranium tetrachloride and a portion thereof to uranium pentachloride, the improved procedure for effecting successive preparations of said chloride of uranium, each by said process, which comprises effecting said reacting at elevated temperature and superatmospheric pressure, thereafter mechanically separating the liquid component of the resulting reaction mixture from the solid component thereof, which solid component comprises the desired end product chloride of uranium, and applying said liquid component, which resultingly comprises unreacted carbon tetrachloride having uranium pentachloride dissolved therein, to comprise said chlorinating agent, resultingly enhanced by the presence of uranium pentachloride as a catalyst for the reaction, in subsequent said preparation.

5. In a process for the preparation of chloride of uranium of the class consisting of uranium tetrachloride and uranium pentachloride, comprising reacting an oxide of uranium with a stoichiometric excess of liquid carbon tetrachloride as a chlorinating agent, to convert a portion of the oxide of uranium to uranium tetrachloride and a portion thereof to uranium pentachloride, the improved procedure for effecting successive preparations of said chloride of uranium, each by said process, which comprises agitating the reaction mixture during said reacting, thereafter mechanically separating the liquid component of the resulting reaction mixture from the solid component thereof, which solid component comprises the desired end product chloride of uranium, and applying said liquid component, which resultingly comprises unreacted carbon tetrachloride having uranium pentachloride dissolved therein, to comprise said chlorinating agent, resultingly enhanced by the presence of uranium pentachloride as a catalyst for the reaction, in subsequent said preparation.

6. In a process for the preparation of chloride of uranium of the class consisting of uranium tetrachloride and uranium pentachloride, comprising reacting an oxide of uranium with a stoichiometric excess of liquid carbon tetrachloride as a chlorinating agent, to convert a portion of the oxide of uranium to uranium tetrachloride and a portion thereof to uranium pentachloride, the improved procedure for effecting successive preparations of chloride of uranium, each by said process, which comprises, effecting said reacting with a ratio of carbon tetrachloride to oxide of at least about six to one by weight, thereafter mechanically separating the liquid component of the resulting reaction mixture from the solid component thereof, which solid component comprises the desired end product chloride of uranium, and applying said liquid component, which resultingly comprises unreacted carbon tetrachloride having uranium pentachloride dissolved therein, to comprise said chlorinating agent, resultingly enhanced by the presence of uranium pentachloride as a catalyst for the reaction, in subsequent said preparation.

7. In a process for the preparation of chloride of uranium of the class consisting of uranium tetrachloride and uranium pentachloride, comprising reacting an oxide of uranium with a stoichiometric excess of liquid carbon tetrachloride as a chlorinating agent, to convert a portion of the oxide of uranium to uranium tetrachloride and a portion thereof to uranium pentachloride, the improved procedure for effecting successive preparations of chloride of uranium, each by said process, which comprises effecting said reacting with a ratio of carbon tetrachloride to oxide of at least six to one by weight, thereafter flowing the resulting reaction mixture into a centrifuge, there separating by centrifugation the liquid component from the solid component thereof, which solid component comprises the desired end product chloride of uranium, and applying said liquid component, which resultingly comprises unreacted carbon tetrachloride having uranium pentachloride dissolved therein, to comprise said chlorinating agent, resultingly enhanced by the presence of uranium pentachloride as a catalyst for the reaction, in subsequent said preparation.

8. The process of claim 1 wherein said chloride of uranium is specifically uranium tetrachloride.

9. The process of claim 1 wherein said chloride of uranium is specifically uranium tetrachloride and said separating is effected specifically by centrifugation.

10. The process of claim 1 wherein said chloride of uranium is specifically uranium tetrachloride, said oxide of uranium is specifically uranium trioxide, and said separating is effected specifically by centrifugation.

11. In the process for the preparation of uranium tetrachloride comprising reacting uranium trioxide with a stoichiometric excess of liquid carbon tetrachloride as a chlorinating agent, to convert ap ortion of the oxide of uranium to uranium tetrachloride and a portion thereof to uranium pentachloride, the improved procedure for effecting successive preparations of said uranium tetrachloride, each by said process, which comprises effecting said reaction at elevated temperature and superatmospheric pressure accompanied by agitation of the reaction mixture, thereafter separating by centrifugation the liquid component of the resulting reaction mixture from the solid component thereof, heating the separated component and contacting it with a stream of inert gas, which resulting solid component comprises the desired end product uranium tetrachloride, and applying said liquid component which resultingly comprises unreacted carbon tetrachloride having uranium pentachloride dissolved therein, to comprise said chlorinating agent, resultingly enhanced by the presence of uranium pentachloride as a catalyst for the reaction, in subsequent said preparation.

12. In a process for the preparation of uranium tetrachloride comprising reacting uranium trioxide with a stoichmetric excess of liquid carbon tetrachloride as a chlorinating agent in the presence of uranium pentachloride as a catalyst, the improved procedure for effecting successive preparations of said uranium tetrachloride, each by said process, which comprises effecting said reacting with carbon tetrachloride substantially free of water, acetone, and sulfur, with a ratio of carbon tetrachloride to oxide of substantially 100 to 15 pounds, and at a temperature within the range of 110° to 190° C., while maintaining the reaction pressure within the range of approximately 95 to 125 lbs./sq./in. by venting the reaction-produced gases, and while agitating the reaction mixture, at the conclusion of the reaction as evidenced by the substantial cessation of reaction gas evolution, reducing the reaction pressure to approximately atmospheric pressure and thereupon maintaining the reaction mixture at the boiling temperature for 1 to 3 hours, thereafter cooling the reaction mixture, flowing the reaction mixture into a centrifuge, there separating by centrifugation the liquid component from the solid component thereof, heating said solid component to a temperature within the range 250° to 300° C. and contacting it with a stream of inert gas, which resulting solid component comprises the desired end product uranium tetrachloride, and applying said liquid component, which resultingly comprises unreacted carbon tetrachloride having uranium pentachloride dissolved therein, to comprise said chlorinating agent and said catalyst, in subsequent said preparation.

13. In a process for the preparation of uranium pentachloride comprising reacting uranium trioxide with a stoichiometric excess of liquid carbon tetrachloride as a chlorinating agent in the presence of uranium pentachloride as a catalyst, the improved procedure for effecting successive preparations of said uranium pentachloride, each by said process, which comprises effecting said reacting with carbon tetrachloride substantially free of water, acetone, and sulfur, with a ratio of carbon tetrachloride to oxide of substantially 100 to 15 lbs., and at a temperature within the range of 110 to 190° C., while maintaining the reaction pressure at substantially 180 lbs./sq./in., and while agitating the reaction mixture, thereafter flowing the reaction mixture into a centrifuge, and separating by centrifugation the liquid component from the solid component thereof, which solid component comprises the desired end product uranium pentachloride, and applying said liquid component, which resultingly comprises carbon tetrachloride having uranium pentachloride dissolved therein, to comprise said fluorinating agent and said catalyst in subsequent said preparation.

14. In a process for the preparation of uranium tetrachloride comprising reacting uranium trioxide with a stoichiometric excess of liquid carbon tetrachloride as a chlorinating agent, to convert a portion of the oxide of uranium to uranium tetrachloride and a portion thereof to uranium pentachloride, the improved procedure for effecting successive preparations of said uranium tetrachloride, each by said process, which comprises effecting said reaction within the temperature range 110° to 190° C. and superatmospheric pressure within the range of 95 to 125 pounds per square inch accompanied by agitation of the reaction mixture, thereafter separating by centrifugation the liquid component of the resulting reaction mixture from the solid component thereof, heating the separated solid component to a temperature within the range 250° to 300° C. and contacting it with a stream of inert gas, which resulting solid component comprises the desired end product uranium tetrachloride, and applying said liquid component which resultingly comprises unreacted carbon tetrachloride having uranium pentachloride dissolved therein, to comprise said chlorinating agent, resultingly enhanced by the presence of uranium pentachloride as a catalyst for the reaction, in subsequent said preparation.

References Cited in the file of this patent

Michael et al.: American Chemical J., vol. 44 (1910), pp. 384–387.

Camboulives: Comptes Rendus, vol. 150, pp. 175–177 (1910).

Mellor: "Treatise on Inorganic and Theoretical Chemistry," vol. 12, pp. 80 and 83.